United States Patent
Rosinus et al.

(10) Patent No.: US 6,631,378 B1
(45) Date of Patent: *Oct. 7, 2003

(54) COMMUNICATION UNIT AND COMMUNICATION METHOD WITH PROFILE MANAGEMENT

(75) Inventors: Michael Rosinus, Grasbrunn (DE); Ernö Kovacs, Stuttgart (DE)

(73) Assignee: Song International (Europe) GmbH, Berlin (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/504,182

(22) Filed: Feb. 15, 2000

(30) Foreign Application Priority Data

Feb. 17, 1999 (EP) .............................. 99103132

(51) Int. Cl.[7] .............................................. G06F 17/00
(52) U.S. Cl. ..................................................... 707/100
(58) Field of Search .............................. 707/1–4, 8–10, 707/100–102, 104.1, 200–204; 709/200–202, 217–219, 227–229; 379/201.01–201.05

(56) References Cited

U.S. PATENT DOCUMENTS

| | | | |
|---|---|---|---|
| 4,081,842 A | * 3/1978 | Harbaugh et al. | 358/409 |
| 5,321,605 A | * 6/1994 | Chapman et al. | 700/107 |
| 5,712,985 A | * 1/1998 | Lee et al. | 700/95 |
| 5,724,569 A | * 3/1998 | Andres | 707/2 |
| 5,740,455 A | * 4/1998 | Pavley et al. | 345/835 |
| 5,905,988 A | * 5/1999 | Schwartz et al. | 707/100 |
| 5,937,411 A | * 8/1999 | Becker | 707/100 |
| 6,141,596 A | * 10/2000 | Gretta et al. | 700/34 |
| 6,237,092 B1 | * 5/2001 | Hayes, Jr. | 709/221 |
| 6,243,825 B1 | * 6/2001 | Gamache et al. | 709/228 |
| 6,297,819 B1 | * 10/2001 | Furst | 345/733 |
| 6,330,322 B1 | * 12/2001 | Foladare et al. | 379/201.02 |

OTHER PUBLICATIONS

Broek Van Den W., et al: "Distributed Database for Third Generation Mobile Systems" Intelligent Networks: The Path to Global Networking, Proceedings of the InteRnational Council for Computer Communication Intelligent Networks Conference, Tampa, May 4–6, 1992, pp. 333–347, XP000684029.

Murase T. et al: "Active Mobile Database Systems for Mobile Computing Environments" IEICE Transactions on Information and Systems, vol. E81–D, No. 5, May 1, 1998, pp. 427–433, XP000766035.

* cited by examiner

*Primary Examiner*—Greta Robinson
*Assistant Examiner*—Harold E. Dodds, Jr.
(74) *Attorney, Agent, or Firm*—Frommer Lawrence & Haug LLP; William S. Frommer; Dennis M. Smid

(57) ABSTRACT

The present invention relates to a communication unit and a communication method for communicating data in a communication system, with storage means (9) for storing a profile data base, said profile data base comprising parameter data describing attributes of the communication system, said parameter data being arranged in parameter sets respectively describing a collection of attributes, whereby the parameter sets are allocated to profile units so that each profile unit comprises at least one parameter set and one parameter set can be allocated to a plurality of profile units, and managing means (10) for managing said parameter data in said profile data base and for controlling a means (18) for reading and writing parameter data from and in said storage means (9). The present invention provides a flexible and efficient way to manage and retrieve profile data in communication systems.

21 Claims, 3 Drawing Sheets

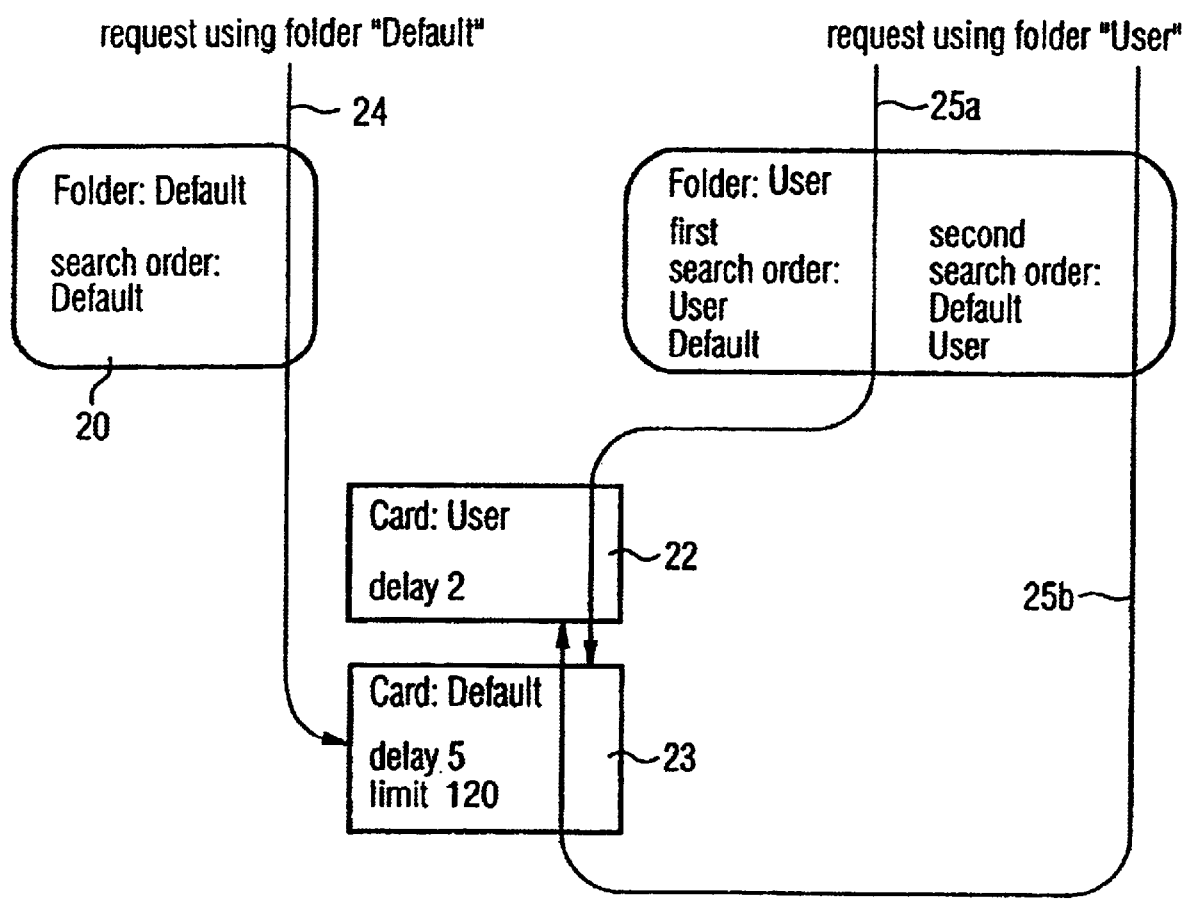

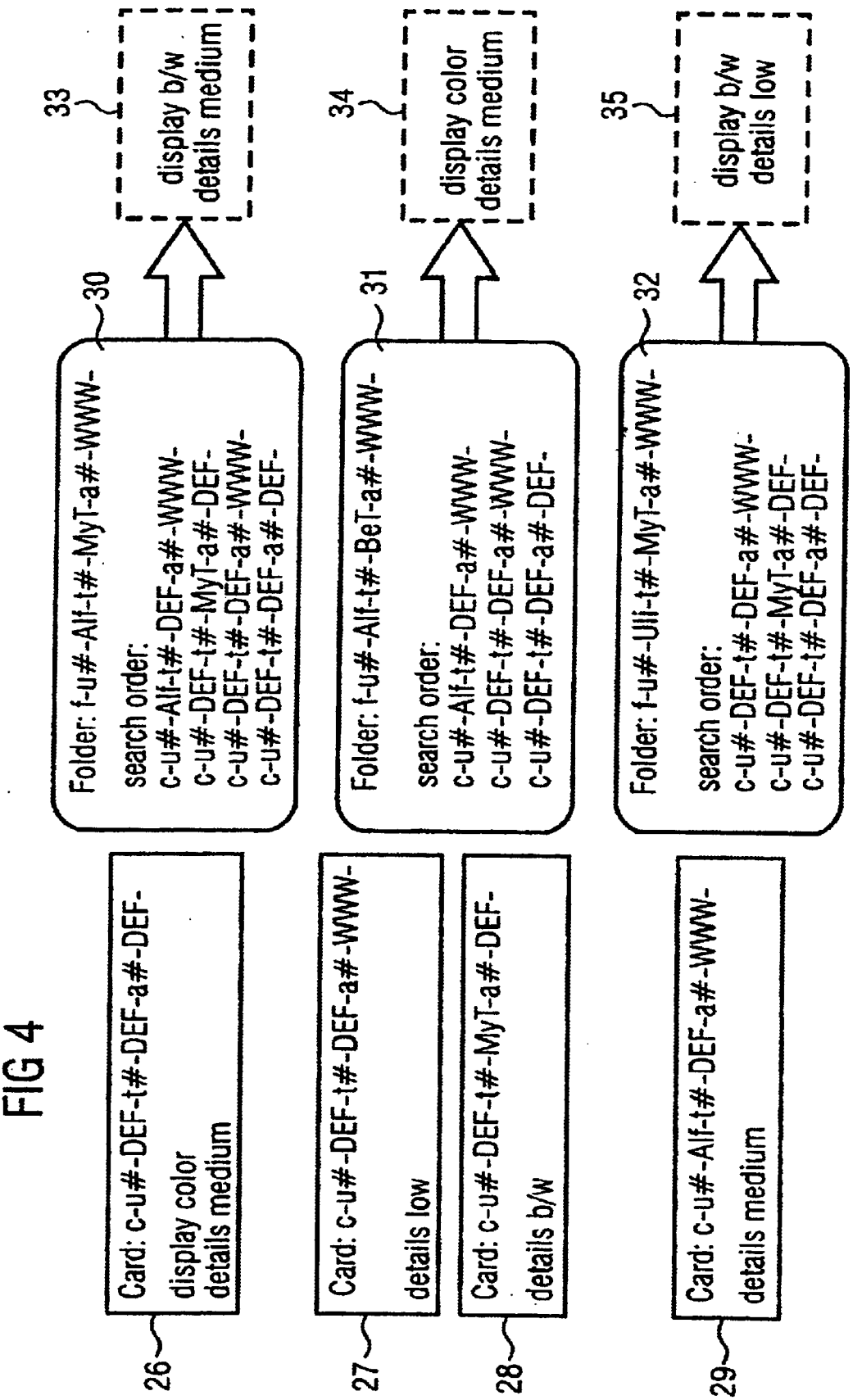

COMMUNICATION UNIT AND COMMUNICATION METHOD WITH PROFILE MANAGEMENT

Figure 1:
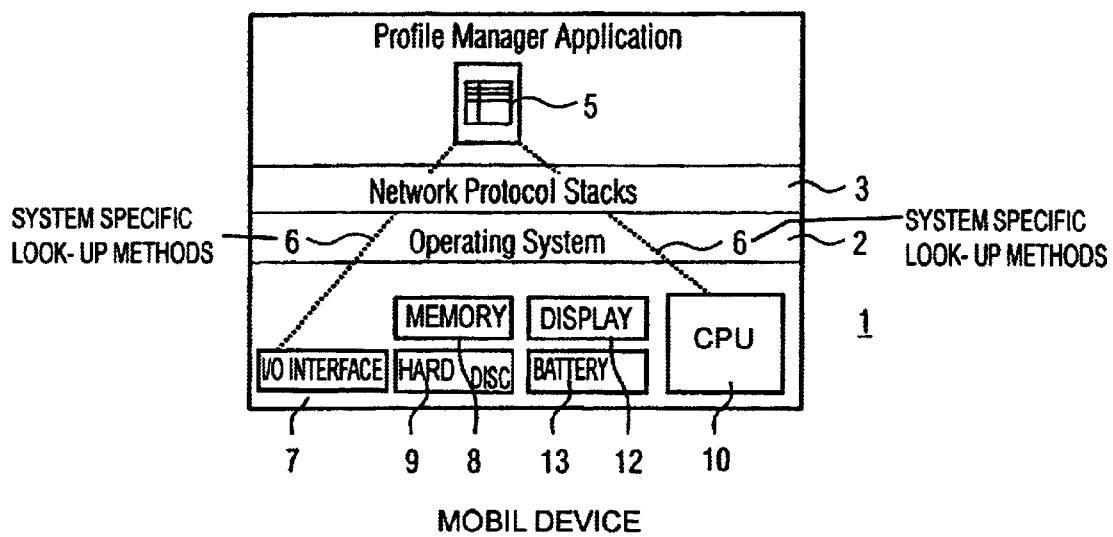

The present invention relates to a communication unit and a communication method for communicating data and a communication system, in which parameter data describing or controlling attributes of the communication system are stored and managed in a profile data base. The communication system can e.g. be or comprise a computing system or a computer network or more specific a distributed wireless computing network. Such a communication system can e.g. consist of a computing system comprising at least one server and a plurality of user terminals, which are connected to a communication system, as e.g. a wireless telecommunication system to communicate data e.g. from a mobile station of the communication system to a computer terminal of the computer system.

Computer applications usually provide numerous parameters to influence their behaviour. One example of such a computer application are services offered over a network to a number of different users. A personalized service can be adapted to the personal needs of a single user. In general in different situations a different set of parameters is required to satisfy different user's needs. Different parameter sets might also be necessary because different users access the application and the users have different requirements. Also, the application might run on different terminals with different capabilities which requires a different behaviour of the application. Generally speaking, different sets of parameters are used for different users, different hardware, different networks, different applications and different situations. Applications can e.g. be a single software program or a collection of software programs.

A collection of parameter data is called a profile and stored in a profile data base. The parameter data describe attributes of the communication system. An attribute describes a single piece of information out of a set of information belonging together. The attributes might therefore describe physical and logical entities in a distributed computing system, e.g. terminal devices in a terminal profile, network properties like quality of service parameters in a network profile or user preferences in a user profile.

An application such as a personalized service needs the correspondingly allocated attributes for describing and/or controlling its behaviour in the respective environment. Therefore, the application accesses a profile data base to retrieve and store parameter data describing the corresponding attributes. The parameter data are thereby arranged in profiles, as mentioned above.

A profile can be stored persistently, e.g. on a persistent memory, a hard disc, a memory card, etc. The profile can be accessed by applications wishing to retrieve the parameter data associated with the profile. Copies of profiles can be stored on various nodes of a distributed computing and/or communication system. If attributes of the communication system change, the profiles containing the corresponding parameter data need to be updated. This is necessary to provide the identical attributes in the profiles stored in each node of the communication system. In known systems, all attributes of a profile are transmitted and updated, if one attribute has been changed in one of the nodes.

The attributes in a profile are usually key/value pairs. When accessing a profile, an application specifies the key and receives the value in return. The key might be flat names or structured names. One possible structuring of names are a tree-like structure. In a tree-like structure, a new name is build by appending a separator symbol and a new relative distinguishing name, e.g. terminal.color and terminal.color.depth. The structure of the tree usually reflects a semantic relation between the different attributes. In the given example, the value of the attribute terminal.color indicates whether the described terminal has a color display or not. Furthermore, the value of the attribute terminal.color.depth indicates the depth of the color map for this display.

In the current state of the art, a profile contains attributes for all entities of the communication system. This description is very static and inflexible. When the state of one of the entities changes, all parameter data of the single profile have to be changed accordingly. Furthermore, the process of retrieving a single data item (the value of an attribute) might be very time-consuming as explained in the following example. Assuming a terminal with several different networks attached, from which only one might be active at a time. Accessing the current speed of the network attached to this terminal involves looking up the current network in the terminal profile, constructing the name of the required data item (attribute) for this network and then retrieving the required value. An application has no high-level way to directly access the current network speed regardless of which network is currently active.

EP 0 479 660 B1 describes a distributed configuration profile for computing systems, which is only used during the binding phase of a distributed application. The configuration profile contains interface identifiers, host binding information and related attributes, e.g. priorities. EP 0 851 696 A2 describes a method of wireless retrieval of profile information. The profile information is static and the structure of the profile is not disclosed.

The object of the present invention is therefore to provide a communication unit and a communication method for communicating data in a communication system, in which attributes of the communication system stored in a profile data base can be flexibly and efficiently controlled, managed and retrieved.

This object is achieved by a communication unit for communicating data in a communication system according to claim 1, comprising storage means for storing a profile data base, said profile data base comprising parameter data describing or controlling attributes of the communication system, said parameter data being arranged in parameter sets respectively describing a collection of said attributes, whereby the parameter sets are allocated to profile units so that each profile unit comprises at least one parameter set and one parameter set can be allocated to a plurality of profile units, and managing means for managing said parameter data in said profile data base and for controlling a means for reading and writing parameter data from and in said storage means.

The above object is also solved by a communication method for communicating data in a communication system according to claim 10, which comprises the steps of storing a profile data base, said profile data base comprising parameter data describing or controlling attributes of the communication system, whereby said parameter data are arranged in parameter sets respectively describing a collection of said attributes, said sets are allocated to profile units so that each profile unit comprises at least one parameter set and one parameter set can be allocated to a plurality of profile units, and managing said parameter data in said profile data base and controlling a means for reading and writing parameter data from and in said profile data base.

The communication unit and the communication method according to the present invention provide a flexible and efficient way to store, control and access different parameter sets. This flexible and efficient way is particularly achieved by arranging the parameter data in parameter sets respectively describing or controlling a collection of attributes, whereby the parameter sets are allocated to profile units so that each profile unit comprises at least one parameter set and one parameter set can be allocated to a plurality of profile units.

Advantageously, each profile unit has an allocated search order according to which the parameter sets of the profile unit are looked through upon searching particular parameter data. Thereby, different search orders can be allocated to one profile unit, whereby one search order is defined for one or more parameters. In other words, more than one search order can be allocated to one profile unit, whereby a particular search order for a specific attribute or a group of attributes is provided.

Advantageously, each profile unit has a name and each parameter set has a name, whereby the parameter sets are allocated to respective profile units by means of their respective names. In this case, the name of a profile unit can consist of one or more individual names and the name of a parameter set can consist of one or more individual names, whereby the name of a profile unit and the name of a parameter set allocated to said profile unit have at least one individual name in common, except for a parameter set containing only default values. Each individual name may respectively describe a specific entity of the system, e.g. either a user, a terminal, a network, an application or a given special situation of the communication network or a default setting indicating an unspecified status. The individual names or a combination of names may thus specify a context.

The present invention therefore provides an automatic allocation of the parameter sets to respective profile units by means of their respective names in an simple and effective way.

Further advantageously, said parameter consist of data pairs, whereby each data pair comprises a key and a value, said key defining a name of an attribute and said value defining the value of said attribute. Thereby, one particular key can have a value chosen from a plurality of possible values. If, e.g. the color of a terminal is to be defined as an attribute, then the corresponding key (name of the attribute) is terminal.color and the value could be "b/w" for a black/white display or "c" for a color display.

A possible search order for the above-mentioned example could be user, terminal. This means, that upon searching particular parameter data, the parameter set named user and defining the user is searched through first, and then the parameter set named terminal and defining the terminal is searched through. Also, a specific search order for a particular attribute or group of attributes can be provided. An example for such a specific search order is the search order terminal, user for the attribute terminal.color.

This means, that for the parameter data type terminal.color, the parameter set defining the terminal is searched through before the parameter set defining the user.

It is a further advantage, if a particular key is contained in a parameter set exactly once or not at all.

Further, the attributes may describe physical and logical entities of the communication system, whereby the attributes contained in a profile unit define a specific situation of the corresponding entities of the communication system.

The communication means according to the present invention may e.g. be a part of a communication terminal of said communication system or a part of a node of said communication system. Advantageously, in the communication method according to the present invention, upon generating of a new parameter set or upon updating parameter data in a parameter set an event information is generated and sent to a registered application in the communication system. Using this event mechanism the processing overhead required to check for changes in the profile data base is largely reduced.

The parameter data stored in the profile data base according to the present invention can e.g. describe the following attributes: a terminal used by a client, the quality of service of an access network, which is usually a wireless network, information about the user, the user's preferences, the configuration information about the distributed system, information about the current situation and/or information about the application currently used. The attributes are therefore related to properties, characteristic, a status, a desired behaviour, etc. of entities of the system. The parameter data can be accessed not only during the binding phase, but during the complete operation phase of the services. Thereby, the profile data base is used by applications or service components using a request/reply access to the data base to retrieve a single attribute or even a group of attributes with a single request so that a high performance is provided. The present invention applies to data services, e.g. internet services, as well as to telephone or voice based services.

Figure 2:
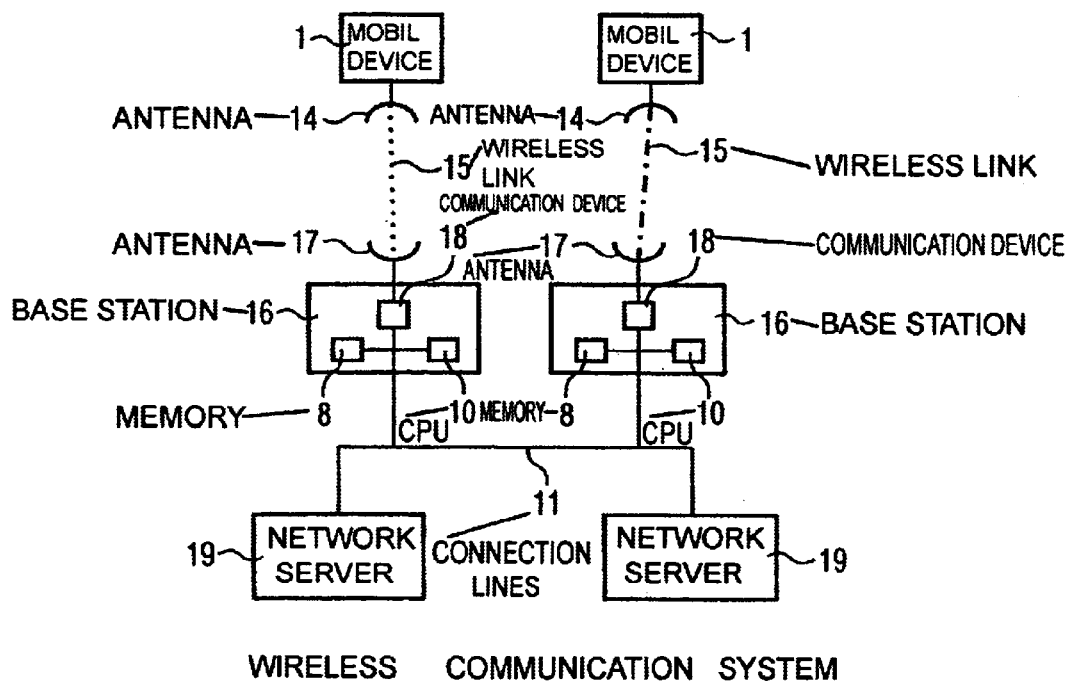

The present invention is explained in detail by means of preferred embodiments of the present invention relating to the enclosed drawings, in which FIG. 1 shows the architecture of the integration of a profile manager application according to the present invention into a mobile device of a wireless telecommunication system, FIG. 2 shows a block diagram of general elements of a distributed wireless telecommunication system, the components of which may be communication units according to the present invention, FIG. 3 shows examples for two different profile units of a profile data base, and FIG. 4 shows an arrangement of different parameter sets in several profile units of a profile data base according to the present invention.

FIG. 1 shows a schematic scheme of the integration of a profile manager application according to the present invention into a mobile device 1. The mobile device 1 can e.g. be a mobile station of a wireless telecommunication system. The mobile device 1 as schematically shown in FIG. 1 comprises the hardware components, an operating system 2 and one or more network protocol stacks 3. The network protocol stacks 3 comprise software protocols for controlling the communication of data in the respective communication system. Further, the mobile unit comprises a profile manager application 5, which retrieves system information from the underlying system through some system specific look-up methods, which are indicated by broken lines 6.

In words of the OSI layer model, the profile manager application 5 is situated in the seventh layer and the profile manager application 5 provides a link to the physical layers comprising e.g. the hardware components 1. The hardware components of the mobile device shown in FIG. 1 comprise an I/O interface 7, a memory unit 8, a hard disc 9, a central processing unit 10, a display 12 and a battery 13. On the hard disc 9, a profile data base is stored, which comprises parameter data describing object settings of the communication system. In other words, the hard disc 9 comprises the profile data base, in which the object settings for different profiles for the profile manager application are stored.

The central processing unit 10, additionally to its usual functions, serves as a managing means for managing said parameter data in the profile data base stored in the memory 8 and for controlling a read/write means of the mobile device for reading and writing parameter data from and in said storage means. The central processing unit 10 thereby manages said profile data base by means of fetching instructions from a program stored on the hard disc 9. Said read/write means also serves for transmitting and receiving data to and from other communication units of the communication system. Although not shown in the schematic drawing of FIG. 1, the mobile device 1 further comprises necessary components known in the art, e.g. a RF unit.

The parameter data describing the attributes of the communication system are stored in the profile data base of the hard disc in a particular arrangement allowing a quick and effective management of the profile data. In general terms, the parameter data are arranged in parameter sets respectively describing a collection of attributes, whereby the parameter sets are allocated to profile units so that each profile unit comprises at least one parameter set and one parameter set can be allocated to a plurality of profile units.

This arrangement of the parameter data in the profile data base according to the present invention is explained in the following by the example of cards and folders. The parameter sets correspond to cards and the profile units correspond to folders. Different cards are available, which are allocated to the different folders, whereby each folder can contain on or more cards. A particular card can thereby be allocated to one or more folders. Each folder is associated with a set of rules in which order to search through the different cards to access an attribute required by a particular application or a particular terminal. For a specific situation, a folder has to be created, which contains the required cards for that particular situation. Given a specific situation, a service, e.g. a personalized service, will use the corresponding folder to access the appropiate parameter set (cards).

The parameter data describing the attributes in the communication system or the communication network respectively comprise a data pair consisting of a key, which defines the name of the corresponding attribute, and a value, which defines the value of the corresponding attribute. An attribute defines properties, characteristics, a status, a desired behaviour etc. of entities of the communication system.

A parameter set (card) is a collection of key/value pairs with the property that a key may appear exactly once or not at all on a single parameter set. A profile unit (folder) is a collection of several cards, whereby a folder has a search order, according to which the cards contained in the folder are searched through when looking for a particular key to read out the corresponding value. For each attribute a different search order can be defined. One folder can thus have a plurality of search orders, one search order for a respective key type. A managing means, e.g. the managing means 10 of the mobile device 1 shown in FIG. 1, manages and controls the cards and folders stored in the profile data base of a single node of the communication system. In the case of FIG. 1, the single node is a mobile device and the profile data base is stored on the hard disc 9. The cards and the folders have names, which are used to reference a specific entity or a collection of entities, which corresponds to a context. The name can be used to express the purpose of the specific card, e.g. this card defines the default parameters of the user A, or this card defines the specific parameters for user A on terminal X. In the language of the present description, the parameters are the attributes, the user A and the terminal X are entities and the user A on terminal X is a context.

As a general example, the cards can be organized so that one card C1 contains a default set of parameters. A second card C2 contains parameters, which are particular for a specific user A. The third card C3 contains parameters that are specific for this user A on a terminal X and a fourth card C4 comprises the parameters for this user A on another terminal Y. Two folders F1 and F2 can be set up, one for the user A on terminal B and one for the user A on terminal Y. The first folder for the user A on terminal B contains the cards C1, C2 and C3, whereby the second folder for the user A on terminal Y contains the cards C1, C2 and C4. Whenever the user changes from one terminal to the other terminal, the personalized service will change the used folder. If the user now wants the service to behave different while he is on terminal Y, he will set the specific parameter in the card C4. The personalized service will access this value when using folder F2, but not when using folder F1.

The profile data base can be modified by creating a new card, writing a new key/value pair onto a card, creating a new folder or defining a new search order for a folder.

If the value of a particular key is required, parameter values may be read from a card or from a folder. In the later case, this is done the following way:

1. take the card the search order determines to be the first for the given key
2. if the key is on the card, return the value of the key
3. elseif no more cards are left→key not present in this folder
4. else take the next card the search order determines
5. go to step 2

Having now described the search mechanism, the hardware structure and a replication mechanism is described in the following.

The folder, the cards and/or the parameter data can be replicated through a distributed system, e.g. through a communication system as shown in FIG. 2. FIG. 2 shows a wireless communication system comprising two mobile stations 1, each comprising an antenna 14, two base stations 16, each comprising a communication device 18 coupled to an antenna 17, a hard disc 9 for storing a profile data base and a managing means 10 for managing the parameter data in the profile data base and for controlling the means 18 for reading and writing parameter data from and in said storage means and for transmitting and receiving data to and from said mobile devices 1 through a wireless link 15. The two base stations 16 are coupled e.g. by connection lines 11 to network servers 19. Although a communication system is shown in FIG. 2, the communication system can also be a combination of a computer network and a communication system. In this case, the base stations 16 can e.g. be computer terminals, which are connected to the network servers 19 through the internet and exchange data with normal portable telephones over an GSM link. Although only the base stations 16 are shown as communication units of the present invention, also the mobile stations 1 and the servers 19 can be communication units according to the present invention.

For the replication of parameter data, cards and folders in a profile data base of the present invention, three different modes for the updating procedure can be used, namely a pull-, a push- and a consistency check mode. The pull mode retrieves a folder or a card from another node (base station, mobile station or server), transmits it over the (wireless) network and puts it in the storage means of the local node. The push mode pushes the content of a local folder or card and moves it to a remote node overwriting a folder of a card with the same name there. The consistency check mode will examine copies of a folder or a card on different nodes, compare the time stamp of the last changement of the key/value pairs and update the older ones. The consistency check mechanism can detect an inconsistent state by determining whether different update operations have been performed in the different profile data bases of the different nodes. Thus, in the example shown in FIG. 2, profile data base containing actual folders, cards and parameter data are stored in storage means in each of the nodes, e.g. the mobile devices 1, the base stations/computer terminals 16 and the network servers 19. Thereby, the replication of entire data bases is usually to expensive so that only the new parts are updated.

FIG. 3 shows an example of two folders 20 and 21 and two cards 22 and 23. The first folder 20 is named "default" and has the search order "default". The second folder 21 is named "user" and has as first search order "user, default" and as second search order "default, user". An application defines a card 23 named "default" with default settings and puts it into the "default" folder 20. The first key/value pair on the "default" card 23 is delay/5 and the second key/value pair is limit/120. At the moment, these parameter data are the only ones available and are accessed in any case. Now, the user or an application wants to change the values of the already defined parameter data. Instead of changing the value on the "default" card 23, what would effect further read accesses, a new card 22 called "user" is created and the new key/value pair delay/2 is written on it. Then a new folder 21 named "user" is created, in which the "default" card 23 and the "user" card 22 are inserted and the first search order for the new folder 21 is defined first to use the "user" card 22 and then the "default" card 23 and the second search order for the new folder 21 is defined first to use the "default" card 23 and then the "user" card 22.

The first search order and the second search order of the new folder 21 can be allocated to a respective different type of parameter data. Reading out the key "limit" will return the value "120" for the search order "default" of folder 20 as well as for the first search order and the second search order of folder 21. A read access to the key "delay" will return the value "5" in case that the folder 20 is used and also in case that the second search order of folder 21 (cf. arrow 25b in FIG. 3) is used. On the other hand, a read access to the key "delay" will return the value "2" in case the first search order of folder 21 (cf. arrow 25a in FIG. 3) is used.

FIG. 4 shows another example of cards and folders and the corresponding allocated search orders. FIG. 4 shows the specific sample of an advantageous way of the present invention to name cards and folders using the names of several entities of the communication system. For personalized services in a communication system one can distinguish between a user, a terminal, a network, an application and a given special situation. All these factors are called entities and for any combination of these entities the profile data base might contain a special attribute or combination of attributes. A combination of these entities is called a context. A context can thus be described through a combination of the individual names of the respective entities. The name of a card is constructed by using the following scheme:

"c-u#<UserName>t#<TerminalName>n#<NetworkName>a#<ApplicationName>s#<SituationName>".

In this scheme the expressions within the brackets, e.g. <UserName>can be replaced either with a regular name e.g. Alf or the default name -DEF-. If the default name -DEF- is chosen, the status of the respective entity is not set or not known, thus unspecified.

Parameter sets (cards) are defined for the following situations:

| Parameter Set | Name |
|---|---|
| a default parameter set | "c-u#-DEF-t#-DEF-n#-DEF-a#-DEF-s#-DEF-" |
| parameter sets for specific users | "c-u#<UserName>t#-DEF-n#-DEF-a#-DEF-s#-DEF-" |
| parameter sets for specific terminals | "c-u#-DEF-t#<TerminalName>n#-DEF-a#-DEF-s#-DEF-" |
| parameter sets for specific networks | "c-u#-DEF-t#-DEF-n#<NetworkName>a#-DEF-s#-DEF-" |
| parameter sets for specific applications | "c-u#-DEF-t#-DEF-n#-DEF-a#<ApplicationName>s#-DEF-" |
| parameter sets for specific situations | "c-u#-DEF-t#-DEF-n#-DEF-a#-DEF-s#<SituationName>" |
| a specific parameter set for any combination of the last five | |
| e.g. user A on terminal X | "c-u#At#Xn#-DEF-n#-DEF-a#-DEF-" |
| e.g. user A on terminal X using network N, | "c-u#At#Xn#Nn#-DEF-a#-DEF-" |

As can be seen from the above table, a parameter set (card) is defined for the following specific entities: specific users, specific terminals, specific networks, specific applications and specific situations. Further, a default parameter set is defined. Further, specific parameter sets for any combinations of the above-mentioned five specific entities can be defined, e.g. a specific parameter set for user A on terminal X or for user A on terminal X using network N.

Then, a set of special profile units (folders) is defined, which, basically contain respectively a set of pre-defined cards. For this special folder a similar naming scheme is used:

"f-u#<UserName>t#<TerminalName>n#<NetworkName>a#<ApplicationName>s #<SitautionName>".

From the name of the folder, the cards can be derived, which are contained by default in the folder by applying the following rules:

1. The default parameter set is contained.
2. If the respective entity is not -DEF- in the context name of the folder, a card that contains only the given entity is added. The cards are added in the following sequence: application, network, terminal, user and situation. If e.g. the context is "f-u#schmidtt#odon#-DEF-a#-DEFs#-DEF", then the two cards "t-u#schmidtt#-DEF-#-DEF-a#-DEFs#-DEF" and "t-u#-DEF-t#odon#-DEF-a#-DEFs#-DEF" are added.
3. Any card which contains two of specified names (e.g. user and terminal), starting by first comparing the ApplicationName with the others, then the NetworkName with the remaining names and so on (using the sequence defined in step 2).
4. Any card which contains three defined names (using again the sequence from step 2).

5. Any card with four defined names.

6. Any card with five defined names.

The folder now contains the above-mentioned card in a "Last In, First Out" order. The default card from step 1 is the lowest card of the search order.

In case that a context changes in one of the nodes of the communication system, the present invention provides a simple and effective way to exchange the contexts in the different profile data bases of the different nodes of the communication system by simply updating or exchanging the respective names of the parameter sets or profile units. Particularly compared to known systems, in which all attributes needed to be updated in such a case, the present invention provides a quick, effective and cheap way of updating and/or changing information stored in the profile data bases.

The particular example of cards and folders shown in FIG. 4 comprises four cards 26, 27, 28 and 29. The first card contains the value "colors" for the key "display" and the value "medium" for the key "details". The second card 27 comprises the value "low" for the key "details". The third card 28 comprises the value "b/w" (black and white) for the key "display". The fourth card 29 contains the value "medium" for the key "details". In the first folder 30, all four cards 26–29 are contained. In the second folder 31, the first card 26, the second card 27 and the fourth card 29 are contained and in the third folder 32, the first card 26, the second card 27 and the third card 28 are contained. Particular search orders are allocated to each of the folders 30, 31 and 32, so that the results shown in the broken line blocks 33, 34 and 35 are obtained if the keys "display" and "details" are searched for in the three folders 30, 31 and 32.

The setting of a value in a specific card will generate an event. Interested applications or software components may register for an event and will then receive an asynchronous notification if a registered event has occurred. Using the event mechanism the processing overhead is reduced, which is required for checking the chances in key/value pairs. The generated event contains a set of attributes. These attributes contain the key that has changed, the new node value, the name of the card and a set of all folders that currently contain this card. A subscriber for the event mechanism might define filters which reduce the amount of event data delivered to an application.

What is claimed is:

1. Communication unit for communicating data in a communication system, with
    storage means for storing a profile data base, said profile data base comprising parameter data describing or controlling attributes of the communication system, said parameter data being arranged in parameter sets each of said parameter sets describing a collection of said attributes,
    whereby each of said parameter sets may be allocated to one or more profile units so that each profile unit comprises at least one parameter set; and
    managing means for managing said parameter data in said profile data base and for controlling a means for reading and writing parameter data from and in said storage means;
    whereby upon the writing of a parameter data to said storage means, said parameter data, all parameter sets comprising said written parameter data, or all parameter units comprising one or more of said parameter sets comprising said written parameter data are selectively updated.

2. Communication unit for communicating data in a communication system according to claim 1,
    characterized in,
    that each profile unit has an allocated search order according to which the parameter sets of the profile unit are looked through upon searching particular parameter data.

3. Communication unit for communicating data in a communication system according to claim 2,
    characterized in,
    that different search orders are allocated to one profile unit, whereby one search order is defined for one or more parameters.

4. Communication unit for communicating data in a communication system according to claim 1,
    characterized in,
    that said parameter data consist of data pairs, each data pair comprising a key and a value, said key defining a name of an attribute and said value defining the value of said attribute.

5. Communication unit for communicating data in a communication system according to claim 4,
    characterized in,
    that a key is contained in a parameter set exactly once or not at all.

6. Communication unit for communicating data in a communication system according to claim 1,
    characterized in,
    that said attributes describe physical and logical entities of the communication system, whereby the attributes contained in a profile unit define a specific situation of the corresponding entities of the communication system.

7. Communication unit for communicating data in a communication system according to claim 1,
    characterized in,
    that each profile unit has a name and each parameter set has a name, whereby the parameter sets are allocated to the respective profile units by means of their respective names.

8. Communication unit for communicating data in a communication system according to claim 7,
    characterized in,
    that the name of a profile unit consists of one or more individual names and the name of a parameter set consists of one or more individual names, whereby the name of a profile unit and the name of a parameter set allocated to said profile unit have at least one individual name in common, except for a parameter set containing only default settings.

9. Communication unit for communicating data in a communication system according to claim 8,
    characterized in,
    that each individual name respectively describes either a user, a terminal, a network, an application or a given special situation of the communication network or a default setting indicating an unspecified status.

10. Communication unit for communicating data in a communication system according to claim 1,
    characterized in,
    being part of a communication terminal of said communication system.

11. Communication unit for communicating data in a communication system according to claim 1, characterized in, being part of a node of said communication system.

12. Communication method for communicating data in a communication system, comprising the steps of storing a profile data base, said profile data base comprising parameter data describing or controlling attributes of the communication system, whereby said parameter data are arranged in parameter sets each of said parameter sets describing a collection of said attributes, each of said parameter sets may be allocated to one or more profile units so that each profile unit comprises at least one parameter set; and managing said parameter data in said profile data base and for controlling a means for reading and writing parameter data from and in said storage means, whereby upon the writing of a parameter data to said storage means, said parameter data, all parameter sets comprising said written parameter data, or all parameter units comprising one or more of said parameter sets comprising said written parameter data are selectively updated.

13. Communication method for communicating data in a communication system according to claim 12, characterized in, that a search order is allocated to each profile unit according to which the parameter sets of said profile unit are looked through upon searching particular parameter data.

14. Communication method for communicating data in a communication system according to claim 13, characterized in, that different search orders are allocated to one profile unit, whereby one search order is defined for one or more parameters.

15. Communication method for communicating data in a communication system according to claim 12, characterized in, that said parameter data consist of data pairs, each data pair comprising a key and a value, said key defining a name of an attribute and said value defining a value of said attribute.

16. Communication method for communicating data in a communication system according to claim 15, characterized in, that a key is contained in a parameter data set exactly once or not at all.

17. Communication method for communicating data in a communication system according to claim 12, characterized in, that said attributes describe physical and logical entities of the communication system, whereby the attributes contained in a profile unit define a specific situation of the corresponding entities of the communication system.

18. Communication method for communicating data in a communication system according to claim 12, characterized in, that each profile unit has a name and each parameter set has a name, whereby the parameters sets are allocated to respective profile units by means of their respective names.

19. Communication method for communicating data in a communication system according to claim 18, characterized in that the name of a profile unit consists of one or more individual names and the name of a parameter set consists of one or more individual names, whereby the name of a profile unit and the name of a parameter set allocated to said profile unit have at least one individual name in common, except for a parameter set containing only default values.

20. Communication method for communicating data in a communication system according to claim 19, characterized in that each individual name respectively describes either a user, a terminal, a network, an application or a given special situation of the communication network or a default setting indicating an unspecified status.

21. Communication method for communicating data in a communication system according to claim 12, characterized in that upon generation of a new parameter set or upon updating parameter data in a parameter set an event information is generated and sent to registered applications in the communication system.

* * * * *